United States Patent
Senda et al.

(10) Patent No.: US 6,977,652 B2
(45) Date of Patent: Dec. 20, 2005

(54) POLYGON RENDERING DEVICE

(75) Inventors: Keiichi Senda, Takaraduka (JP); Shigeo Asahara, Ikeda (JP); Kenji Nishimura, Nabari (JP); Hitoshi Araki, Yawata (JP); Masato Yuda, Osaka (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 419 days.

(21) Appl. No.: 09/988,325

(22) Filed: Nov. 19, 2001

(65) Prior Publication Data
US 2002/0063708 A1 May 30, 2002

(30) Foreign Application Priority Data
Nov. 24, 2000 (JP) ........................................ 2000-357931

(51) Int. Cl.[7] ............................................. G06T 15/00
(52) U.S. Cl. ..................................................... 345/423
(58) Field of Search ................................. 345/419, 423, 345/426, 428, 582

(56) References Cited

U.S. PATENT DOCUMENTS

| | | | | |
|---|---|---|---|---|
| 5,303,340 A | * | 4/1994 | Gonzalez-Lopez et al. | 345/441 |
| 5,335,319 A | * | 8/1994 | Obata | 345/441 |
| 5,428,717 A | * | 6/1995 | Glassner | 345/423 |
| 5,575,125 A | * | 11/1996 | Lalvani | 52/311.2 |
| 6,078,331 A | * | 6/2000 | Pulli et al. | 345/423 |
| 6,437,780 B1 | * | 8/2002 | Baltaretu et al. | 345/423 |
| 6,798,410 B1 | * | 9/2004 | Redshaw et al. | 345/427 |

OTHER PUBLICATIONS

Yamaguchi, Fujio: A Unified Approach to Interference Problems Using a Triangle Processor, Proceeding of SIGGRAPH '85, Jul. 1985.

* cited by examiner

Primary Examiner—Phu K. Nguyen
(74) Attorney, Agent, or Firm—Wenderoth, Lind & Ponack, L.L.P.

(57) ABSTRACT

A polygon rendering device carries out a polygon division process for generating, based on polygon data which specifies a polygon to be rendered, a plurality of partial polygon data each specifying one piece of partial polygons which are obtained by dividing the polygon. Then, a rendering process is performed based on the generated partial polygon data so as to generate image data which represents an image of the polygon. Here, each of the partial polygons includes a plurality of triangles which respectively include a vertex of the polygon, and each of the triangles included in each of the partial polygons shares at least one edge with at least one other triangle included in the same partial polygon. In such a manner, the polygon rendering device can render polygons at high speeds.

7 Claims, 12 Drawing Sheets

F I G. 1 1 PRIOR ART
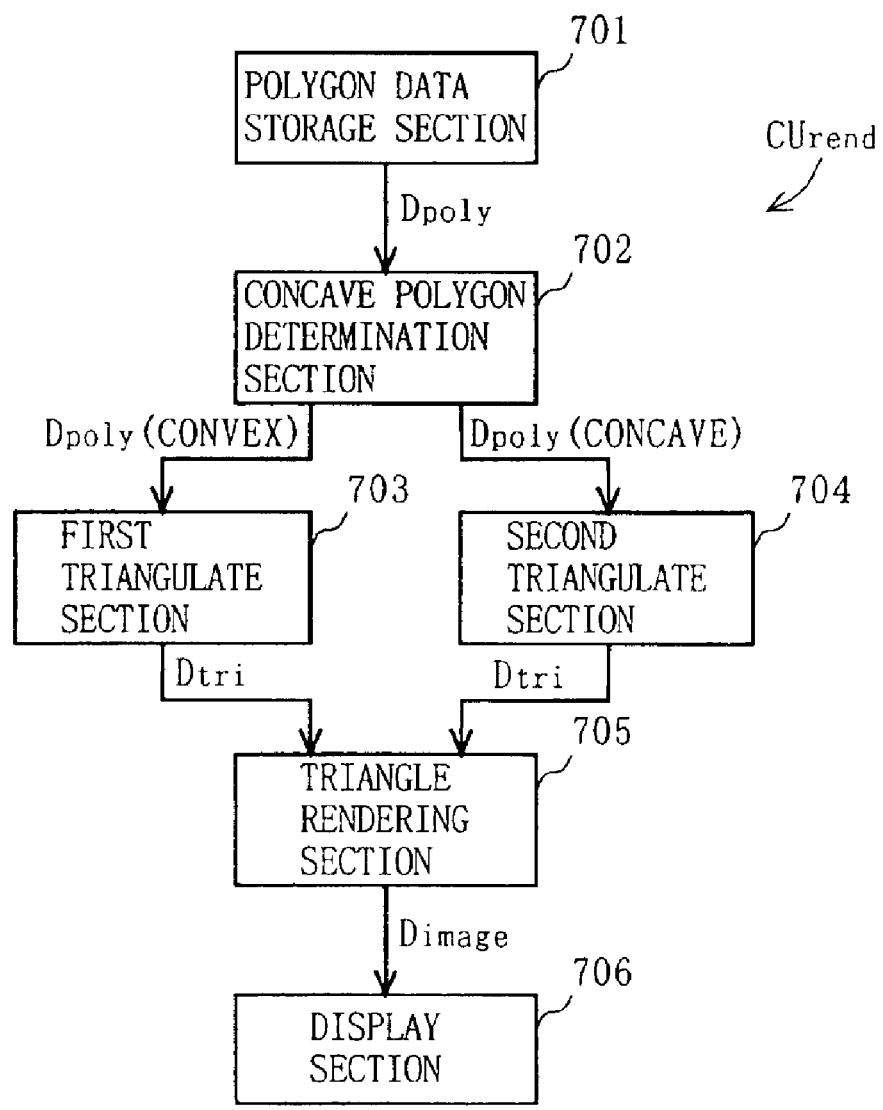

F I G. 1 2 PRIOR ART
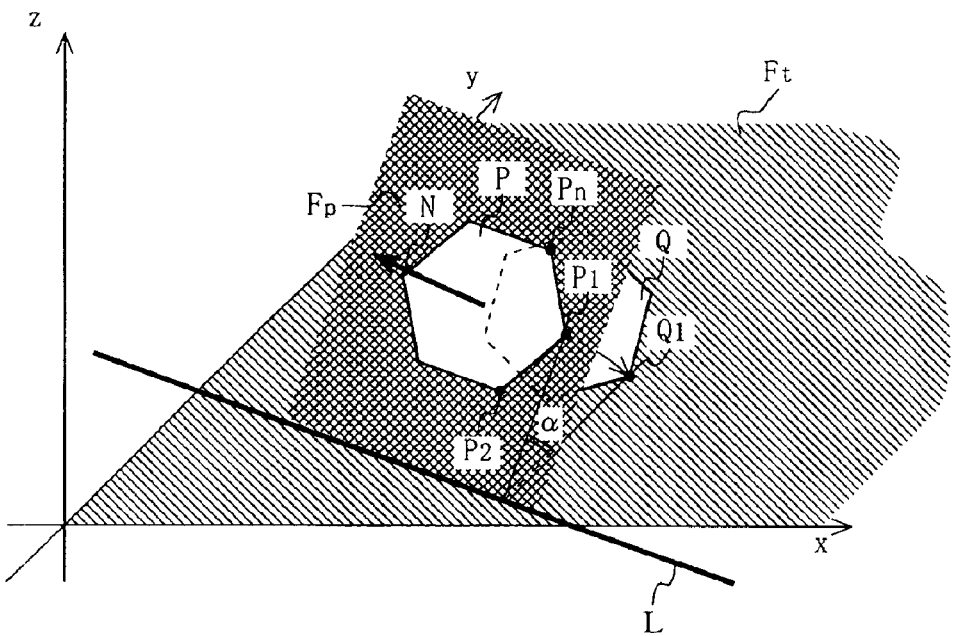
F I G. 1 3 PRIOR ART
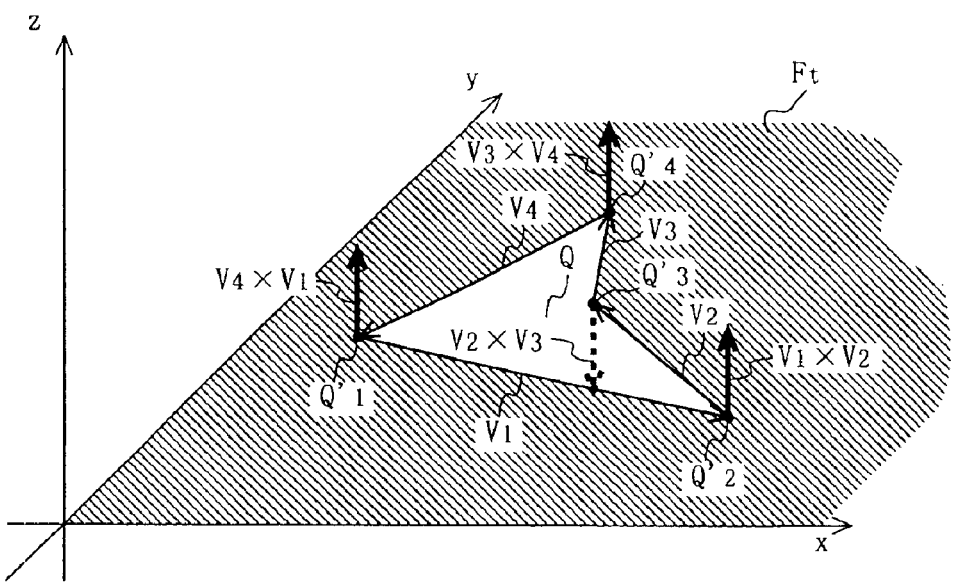

POLYGON RENDERING DEVICE

BACKGROUND OF THE INVENTION

1. Field of the Invention

The present invention relates to rendering devices and, more specifically, to rendering devices which go through a rendering process of generating image data representing polygons for display on display devices.

2. Description of the Background Art

Rendering processes are found in many documents, e.g., Yamaguchi, Fujio: A Unified Approach to Interference Problems Using a Triangle Processor, Proceeding of SIGGRAPH '85, July 1985. FIG. 11 is a block diagram showing the basic structure of a conventional rendering device CUrend. The rendering device CUrend of FIG. 11 includes a polygon data storage section 701, a concave polygon determination section 702, a first triangulate section 703, a second triangulate section 704, a triangle rendering section 705, and a display section 706.

Described below is the operation of such a conventional rendering device CUrend. The polygon data storage section 701 stores several pieces of polygon data Dpoly. One piece of polygon data Dpoly includes at least n (where n is a natural number of 3 or larger) sets of vertex coordinates P1 to Pn so that a polygon P is rendered. Here, the vertex coordinates P1 to Pn are two-dimensional (2D) or three-dimensional (3D) coordinates. If being 3D coordinates, all of the vertex coordinates P1 to Pn need to be located on a single plane. The polygon data Dpoly sometimes accompany various other information together with the vertex coordinates P1 to Pn. Such additional information will be described later as appropriate.

The concave polygon determination section 702 receives the polygon data Dpoly from the polygon data storage section 701. In the case that the vertex coordinates P1 to Pn included in the polygon data Dpoly are 3D, a similarity transformation process is applied onto a predetermined 2D plane (hereinafter, xy plane) Ft.

Assuming now that the polygon data Dpoly includes n sets of vertex coordinates describing the polygon P, i.e., P1 (xl, yl, zl), P2(x2, y2, z2), . . . , Pn(xn, yn, zn). In the similarity transformation process, the concave polygon determination section 702 first calculates a normal vector N to the polygon P. If the derived normal vector N is parallel to the z-axis, every z coordinate of the vertex coordinates P1 to Pn is changed in value to 0. The resultant vertex coordinates Q1(x1, yl, O) to Qn(xn, yn, O) represent the polygon P orthogonally projected onto the xy plane Ft.

As to the similarity transformation process for the case where the normal vector N is not parallel to the z-axis, FIG. 12 is referred to. In such a case, the concave polygon determination section 702 finds an intersection line L of the xy plane Ft and a plane Fp which includes the polygon P. Also, found is an angle α between the xy plane Ft and the plane Fp. After finding the intersection line L and the angle α, the concave polygon determination section 702 rotates the vertex coordinates P1 (xl, yl, zl) to Pn(xn, yn, zn) on the plane Fp about the linear intersection line L by the angle α. As a result, vertex coordinate set group Q'1(x'1, y'1, 0) to Q'n(x'n, y'n, O) are derived.

As is evident from the above description, the group of the vertex coordinates Q1(x1, yl, 0) to Qn(xn, yn, O), orthe group of the vertex coordinates Q'1(x'1, y'1, 0) to Q'n(x'n, y'n, 0) represents a polygon Q. Described below is a process to be applied to the polygon Q representedby the group of the vertex coordinates Q'1 to Q'n. Here, this process is the same to the polygon Q represented by the group of the vertex coordinates Q1 to Qn, and thus is not described.

The concave polygon determination section 702 goes through a concave-convex determination process to determine whether the polygon Q is a concave polygon or not. FIG. 13 is a diagram in assistance of explaining an exemplary concave-convex determination process. Note that, although n is exemplarily 6 in the above similarity transformation process, now in the concave-convex determination process, n is presumably 4 for convenience.

In the concave-convex determination process, the concave polygon determination section 702 first calculates 3D vectors V1(a1, b1, c1) to Vn(an, bn, cn) representing 1st to nth polygon edges of the polygon Q. As to those 3D vectors V1 to Vn, their z components c1 to cn are all 0. The 3D vector V1(a1, b1, c1) can be calculated from the vertex coordinates Q'1 and Q'2, and is equal to (x'2−x'1, y'2−y'1, 0). In the case where 2<=i<=n−1, the 3D vector Vi(ai, bi, ci) can be calculated from the vertex coordinates Q'1 and Q'(i+1), and is equal to (x'(i+1)−x'i, y'(i+1)−y'i, 0). In the case where i=n, the 3D vector Vn(an, bn, cn) can be calculated from the vertex coordinates Q'n and Q'1, and is equal to (x'1−x'n, y'1−y'n, 0).

After calculating all of the 3D vectors V1 to Vn, the concave polygon determination section 702 calculates, sequentially, an outer product of any two vectors of polygon edges of the polygon Q intersecting with each other, i.e., V1×V2, V2×V3, . . . , V(n−1)×Vn, Vn×V1. If z components of the resultant outer product vectors V1×V2, V2×V3, . . . , V(n−1)×Vn, Vn×V1 show the same negative or positive sign, or 0, the concave polygon determination section 702 determines that the polygon Q is a convex polygon, otherwise a concave polygon.

The polygon Q is the one projected the polygon P onto the xy plane Ft. Therefore, if the polygon Q is determined as being a convex polygon, the concave polygon determination section 702 determines that the polygon P is also a convex polygon, and passes the polygon data Dpoly received from the polygon data storage section 701 to the first triangulate section 703. On the other hand, if the polygon P is determined as being a concave polygon, the polygon data Dpoly is forwarded to the second triangulate section 704.

Here, in the case where the polygon data Dpoly includes any additional information indicating the concave-convex attribute of the polygon P, the concave polygon determination section 702 does not go through the concave-convex determination process utilizing outer products, but refer to the concave-convex attribute to determine whether the polygon Q, i.e., polygon P, is a concave polygon.

To the received polygon data Dpoly, the first triangulate section 703 applies a first triangulate process so that the convex polygon P is represented by a plurality of independent triangles. In the first triangulate process, the first triangulate section 703 selects 3 sets of the vertex coordinates P1, P2, and P3 from the polygon data Dpoly to generate triangle data Dtril. Conceptually, the convex polygon P is divided into ΔP1 P2 P3 structured by the vertex coordinates P1, P2, and P3. In the below, Δ denotes a triangle. For example, ΔP1 P2 P3 represents a triangle structured by the vertex coordinates P1, P2, and P3.

Next, the first triangulate section 703 selects 3 sets of the vertex coordinates, this time, P1, P3, and P4, to generate triangle data Dtri2. Thereafter, when 3<=i<=n−2, the first triangulate section 703 selects in the same manner 3 sets of the vertex coordinate sets P1, P(i+1), and P(i+2) so as to generate triangle data Dtri3 to Dtri (n−2). Conceptually, the convex triangle P is divided into (n−2) pieces of triangles. The resultant (n−2) pieces of triangle data Dtri1 to Dtri (n−2) are passed to the triangle rendering section 705. Here, when the received polygon data Dpoly includes additional information, the first triangulate section 703 also passes it to the triangle rendering section 705.

The second triangulate section 704 retains the polygon data Dpoly coming from the concave polygon determination section 702, and applies thereto a second triangulate process so that the concave polygon P is represented by a plurality of independent triangles. FIG. 14 shows the procedure of the second triangulate process. In FIG. 14, the second triangulate section 704 checks the vertexes of the concave polygon P for which vertex type, i.e., a concave vertex or a convex vertex, and counts the number Nc of the concave vertexes (step S1001). Here, the concave vertex means a vertex of the concave polygon P with an interior angle exceeding 180 degrees. Conversely, the convex vertex means a vertex with an interior angle smaller than 180 degrees.

In step S1001, in more detail, carried out first is the same process as the concave-convex determination process performed by the concave polygon determination section 702. That is, the second triangulate section 704 calculates, sequentially, an outer product of any two vectors, i.e., polygon edges, extending from one vertex Pi (where i=1, 2, . . . , n) of the concave polygon P. The current vertex Pi is then checked for its vertex type based on the z component of the calculated outer product, i.e., which sign the z component is showing. If the z component is showing 0, either of the vertex types is applicable to the vertex Pi.

After checking all of the z components of the outer products, the second triangulate section 704 counts the number Nc of the concave vertexes. The procedure then goes to step S1002. Here, in the below discussion, the vertex Pi determined as being the concave vertex in step S1001 is referred to as a concave vertex CPi, otherwise a convex vertex VPi.

In the case where the number Nc is not 0 in step S1002, the second triangulate section 704 selects one convex vertex VPi from those others as a reference vertex Pb (step S1003). Then, the second triangulate section 704 selects, from the vertex coordinates P1 to Pn, two sets of vertex coordinates Pk and Pj (where k=1, 2, . . . n, j=1, 2, . . . , n, and k≠j) adjacent to the reference vertex Pb. Accordingly, the second triangulate section 704 forms a partial triangle ΔPb Pk Pj with the reference vertex Pb, and the vertexes Pk and Pj (step S1004).

The second triangulate section 704 then determines whether there are any other vertexes P1 to Pn in the partial triangle ΔPb Pk Pj (step S1005).

If determined Yes, the second triangulate section 704 regards the image data Dimage which will be generated by the triangle rendering section 705 as not representing the polygon P correctly. In other words, the partial triangle ΔPb Pk Pj formed in step S1004 is regarded as not being usable for rendering the polygon P correctly. The procedure thus returns to step S1003. The second triangulate section 704 selects again this time another convex vertex VPi which is not yet selected from those others as the reference vertex Pb (step S1003). The procedure then goes through steps S1004 and S1005.

On the other hand, if determined in step S1005 that there is no other vertexes P1 to Pn, the second triangulate section 704 regards the partial triangle ΔPb Pk Pj formed in step S1004 as being usable for rendering the polygon P correctly. The procedure then goes to step S1006. The second triangulate section 704 generates and retains triangle data Dtri which represents the partial triangle ΔPb Pk Pj formed by the vertexes Pb, Pk, and Pj (step S1006).

The second triangulate section 704 then determines whether polygon data Dpoly' can be generated from the polygon data Dpoly which is currently at hand (step S1007). To be more specific, from the polygon data Dpoly, the second triangulate section 704 eliminates the reference vertex coordinates Pb selected in step S1003. If there are no more vertexes left, the second triangulate section 704 determines that the polygon data Dpoly' cannot be generated so that the procedure goes to step S1010. Then, the second triangulate section 704 forwards, to the triangle rendering section 705, at least one triangle data Dtri generated in step S1006. In the case where the originally-received polygon data Dpoly includes any additional information, the second triangulate section 704 also passes it to the triangle rendering section 705.

On the other hand, if there are any vertexes left after eliminating the reference vertex coordinates Pb, the polygon data Dpoly' is determined as being generable so that the procedure goes to step S1008. Accordingly, the second triangulate section 704 generates the polygon data Dpoly'. As such, the resultant polygon P' represented by the polygon data Dpoly' is the one formed by the vertexes P1 to Pn of the polygon P except for the reference vertex Pb.

The second triangulate section 704 then sets the generated polygon data Dpoly' as the polygon data Dpoly(step S1008), and the procedure returns to step S1001. In step S1001 this time, the second triangulate section 704 counts the number Nc of the concave vertexes CPi of the polygon P'. Thereafter, the second triangulate section 704 determines if the number Nc is 0 or not, and if not 0, the procedure goes through steps S1003 to S1008 with the newly-set polygon data Dpoly.

If the number Nc is 0, the polygon P' is determined as being a convex polygon, and the second triangulate section 704 applies the first triangulate process to the polygon P' (step S1009) Assuming that the number of vertexes of the polygon P' is Nv, the second triangulate section 704 resultantly generates (Nv−2) pieces of triangle data Dtri1 to Dtri(Nv−2).

The second triangulate section 704 forwards, to the triangle rendering section 705, at least one triangle data Dtri generated in step S1006, and (Nv−2) pieces of triangle data Dtri1 to Drti (Nv−2) generated in step S1009 (step S1010). In the case where the originally-received polygon data Dpoly includes any additional information, the second triangulate section 704 also passes it to the triangle rendering section 705.

As such, the triangle rendering section 705 receives various pieces of triangle data Dtri from the first triangulate section 703 or the second triangulate section 704. The triangle rendering section 705 may also receive any additional information about the polygon data Dpoly. The triangle rendering section 705 follows the additional information, specifically color information included therein, to color-fill a region formed by 3 sets of vertex coordinates Pr (where r=1, 2, . . . , n), Ps (where s=1, 2, . . . , n), and Pt (where t=1, 2, . . . , n, but r≠s≠t) included in one of the received triangle data Dtri. Thereafter, until no triangle data Dtri is left at hand, the triangle rendering section 705 repeats such a rendering process as color-filling the region formed by three sets of the vertex coordinates Pr, Ps, and Pt. As a result, the image data Dimage representing the polygon P is generated in the internal memory of the triangle rendering section 705. In accordance with thus generated image data Dimaqe, the display section 706 applies a display process so that the polygon P is displayed on its screen.

As such, in the conventional rendering device CUrend, the triangle rendering section 705 applies the rendering process on a triangle basis to the polygon data Dpoly. This results in several pieces of triangle data Dtri from the polygon data Dpoly. The problem here is that the larger the number of vertexes of the polygon P to be rendered, the greater the number of triangle data Dtri to be generated. As a result, the time taken for the triangle rendering section 705 to go through the rendering process becomes longer.

Especially, if the polygon P is a concave polygon, the second triangulate process (see FIG. 14) is required, which is not as simple as the first triangulation process. Therefore, it takes a greater amount of time for the conventional rendering device CUrend to render the concave polygon P.

SUMMARY OF THE INVENTION

Therefore, an object of the present invention is to provide rendering devices capable of rendering polygons at high speeds.

The present invention has the following features to attain the object above.

A first aspect of the present invention is directed to a device for rendering a polygon which comprises: a polygon division section for generating, based on polygon data which specifies a polygon to be rendered, a plurality of partial polygon data each specifying one piece of partial polygons which are obtained by dividing the polygon; and a partial polygon rendering section for performing a rendering process, and based on the partial polygon data generated by the polygon division section, generating image data which represents an image of the polygon.

In the first aspect, each of the partial polygons include a plurality of triangles which respectively include a vertex of the polygon, and each of the triangles shares at least one edge with at least one other triangle included in the same partial polygon.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a block diagram showing the basic structure of a conventional rendering device CUrend;

FIG. 12 is a diagram in assistance of explaining similarity transformation in the rendering device CUrend of FIG. 11;

FIG. 13 is a diagram in assistance of explaining concave-convex determination in the rendering device CUrend of FIG. 11.

DESCRIPTION OF THE PREFERRED EMBODIMENT

Described first are marks Δ, ∠, and □ found often in the following embodiment. The mark Δ denotes a triangle. For example, ΔP1 P2 P3 denotes a triangle formed by vertexes P1, P2, and P3. The mark ∠ denotes an angle. For example, ∠P1 P2 P3 denotes an angle formed by points P1, P2, and P3. Further, the mark □ denotes a rectangle. For example, □P1 P2 P3 P4 denotes a rectangle formed by vertexes P1, P2, P3, and P4.

Figure 1:
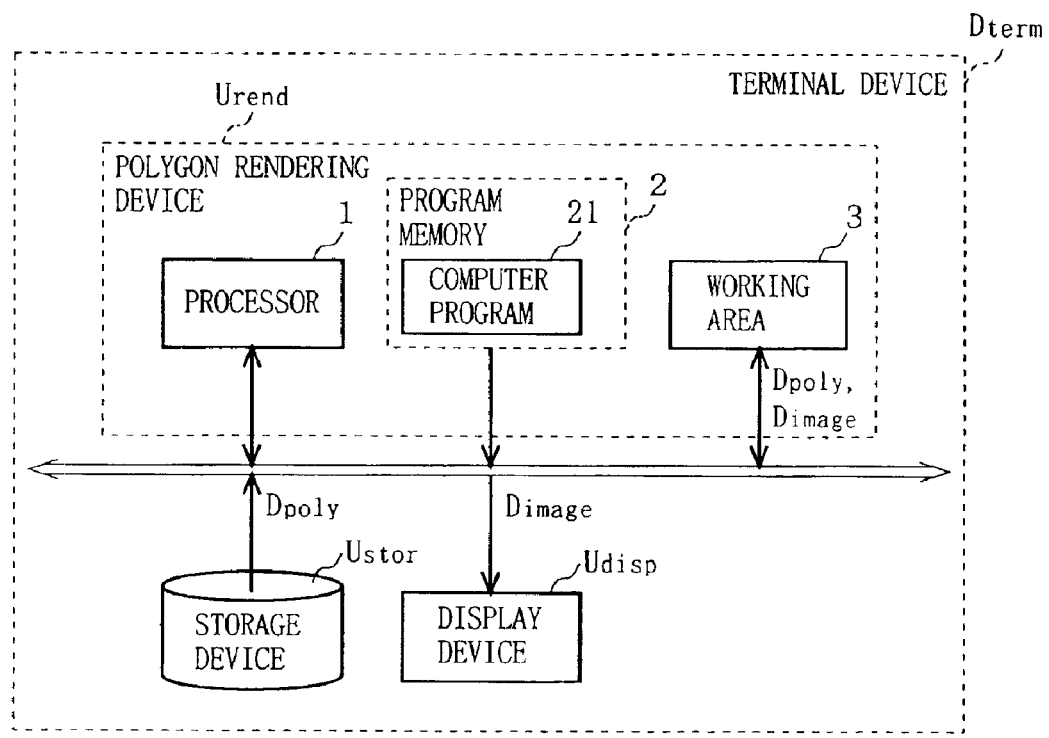
FIG. 1 is a block diagram showing the structure of a polygon rendering device Urend according to one embodiment of the present invention.

FIG. 1 is a block diagram showing the structure of a terminal device Dterm to which a polygon rendering device Urend of one embodiment of the present invention is incorporated. In the terminal device Dterm of FIG. 1, the polygon rendering device Urend is connected to a storage device Ustor and a display device Udisp for communication therewith.

The polygon rendering device Urend includes a processor 1, a program memory 2, and a working area 3. The processor 1 is typically composed of a CPU (Central Processing Unit) or an MPU (Micro Processing Unit). The program memory 2 is typically composed of an ROM (Read Only Memory), and stores a computer program 21. The working area 3 is typically composed of an RAM (Random Access memory). Herein, the combination of the processor 1, the program memory 2, and the working area 3 structure not only the polygon rendering device Urend, but also an unwanted point elimination section and a concave polygon determination section.

In the polygon rendering device Urend in such a structure, the processor 1 goes through a sequence of processes in accordance with the program 21, and on the basis of polygon data Dpoly stored in the storage device Ustor, generates image data Dimage on the working area 3.

Figure 2:
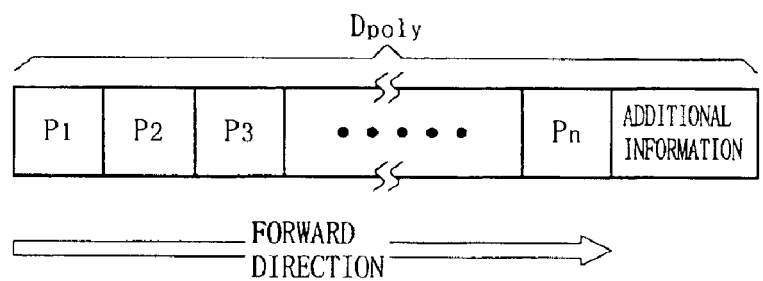
FIG. 2 is a diagram showing an exemplary structure of the basic data structure of polygon data Dpoly to be processed by the polygon rendering device Urend of FIG. 1.

Here, the storage device Ustor stores at least one piece of polygon data Dpoly which specify the polygon P to be rendered. One piece of polygon data Dpoly preferably includes, as shown in FIG. 2, n sets of vertex coordinates P1 to Pn so that the polygon P is specifically rendered. Here, the vertex coordinates P1 to Pn are two-dimensional (2D) or three-dimensional (3D) coordinates. If being 3D coordinates, all of the vertex coordinates P1 to Pn need to be located on a single plane.

In order to define the polygon P by shape, the polygon data Dpoly also includes connection information which specifies the connection relationships among the vertexes P1 to Pn. In the present embodiment, preferably, the connection information indicates in order the vertex coordinates P1 to Pn in the data structure of FIG. 2. More specifically, the polygon data Dpoly includes the vertex coordinates P1 to Pn in such an order that the polygon P can be derived if connecting those coordinates in one stroke in the forward direction, starting from the vertex coordinates P1 and returning thereto. The polygon data Dpoly sometimes accompany various other information together with the vertex coordinates P1 to Pn. Such additional information is not essential for the present invention, and will be described later only when necessary.

The display device Udisp applies a display process in accordance with the image data Dimage coming from the working area 3 so that the resultant polygon P is displayed on its screen.

Figure 3:
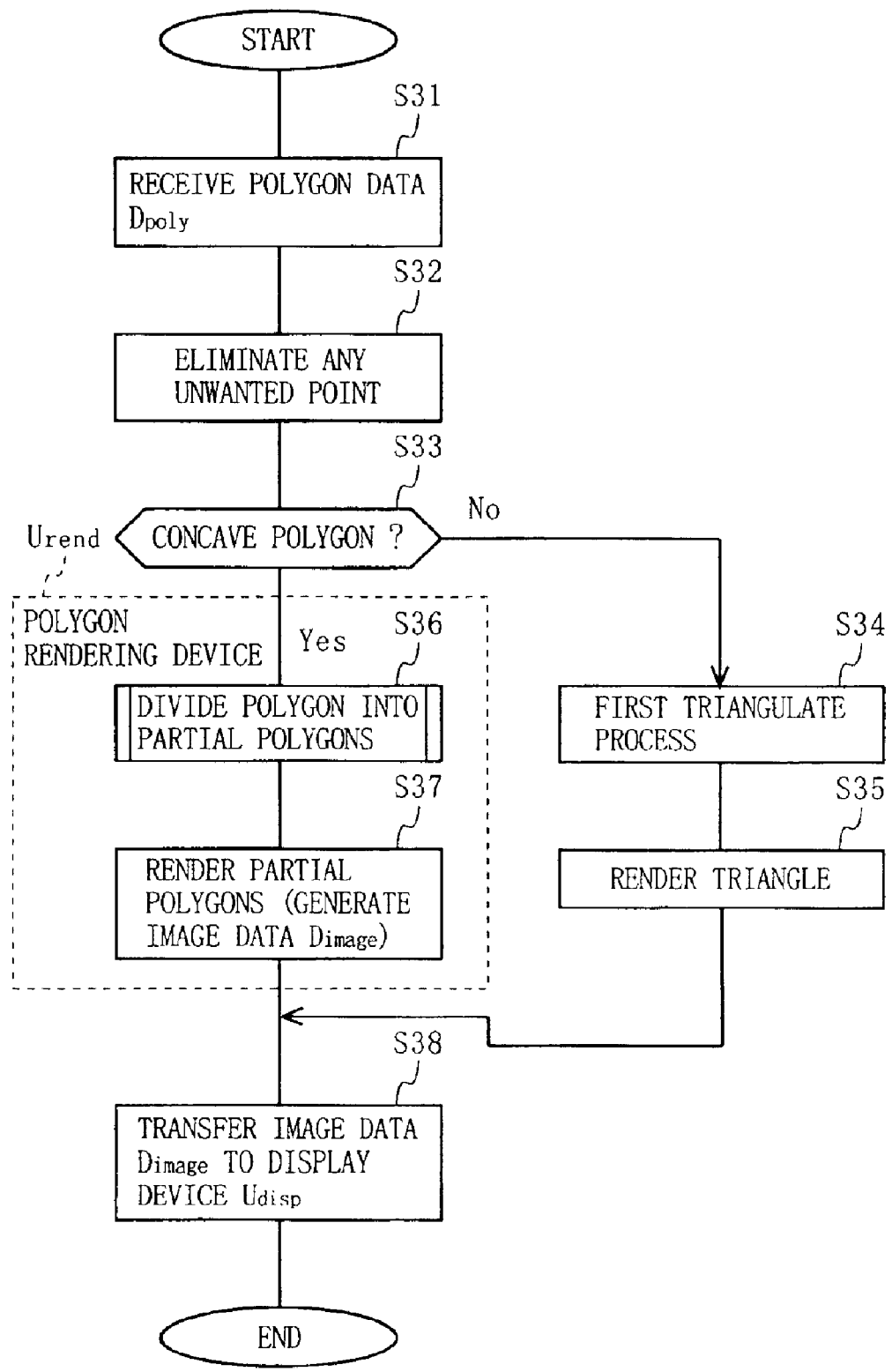
FIG. 3 is a main flowchart showing the procedure of a processor 1 of FIG. 1.

Described next is the operation of the terminal device Dterm in such a structure, focusing on the operation of the polygon rendering device Urend. FIG. 3 is a main flowchart showing the procedure of the processor 1 which is described in the program 21. Immediately after starting the program 21, the processor 1 reads out the polygon data Dpoly from the storage device Ustor for required piece(s). Here, the polygon data Dpoly is the one specifying the polygon P to be rendered. The read-out polygon data Dpoly is then transferred onto the working area 3 so that the polygon data Dpoly is retrieved (step S31). In the present embodiment, for the sake of simplicity, the processor 1 presumably retrieves one piece of polygon data Dpoly.

Thereafter, the processor 1 applies a process to the polygon data Dpoly on the working area 3 so as to eliminate, from the vertex coordinates P1 to Pn, any vertex coordinates Pi (where i is 1, 2, ..., n) considered unwanted for rendering the polygon P (step S32). Here, step S32 corresponds to the unwanted point elimination section.

As a general rule, the vertex coordinates P1 to Pn each define an edge end of the polygon P. In some cases, however, the vertex coordinates Pi may happen to be on the polygon edges of the polygon P. Such vertex coordinates Pi are not used for polygon rendering, and worse yet, impair efficiency in the later processes. This is the reason why the processor 1 applies the process in S32 to eliminate any unwanted vertex coordinates. In step S32, in more detail, the processor 1 first calculates 3D vectors Vi (where i=1, 2, ..., n) each representing a polygon edge of the polygon P. Here, the polygon data Dpoly presumably includes n sets of 3D vertex coordinates P1 (xl, yl, zl), P2 (x2, y2, z2), ..., Pn (xn, yn, zn). Here, if i≠n, the 3D vectors Vi are directed from the vertex Pi to P(i+1). If i=n, the 3D vector Vn is directed from the vertex Pn to P1.

After calculating all of the 3D vectors Vi, the processor 1 calculates an outer product of any two vectors of the polygon P intersecting with each other, i.e., V1×V2, V2×V3, ..., Vi×V(i+1), Vn×V1. Here, if the absolute value of Vi×V(i+1) is 0, it is known that the vertexes P(i−1), Pi, and P(i+1) are all positioned on the same polygon edge. Accordingly, the vertex Pi is unwanted, and thus the processor 1 eliminates it from the polygon data Dpoly on the working area 3. In the case where the polygon data Dpoly includes additional information indicating the number of vertexes, the processor 1 decrements the number by 1. If there are no unwanted vertex coordinates, such as Pi, the polygon data Dpoly is left untouched on the working area 3.

Note here that there is no need for such an elimination process if some special process will be applied when the polygon data Dpoly includes additional information about each of the vertexes P1 to Pn, or when the polygon data Dpoly carries several of the same vertex coordinates P sequentially.

Described below is the case where no unwanted vertex P1 is eliminated in step S32. As to the case where some unwanted vertex Pi is eliminated in step S32, the same is applicable in the basic sense, and thus will not described.

In the next step S33, the processor 1 applies, to the polygon data Dpoly on the working area 3, the same process as the one performed by the concave polygon determination section 702 of FIG. 11 so as to determine whether the polygon P specified by the polygon data Dpoly is a concave or convex polygon. Here, step S33 corresponds to the concave polygon determination section.

When the polygon P is determined as being a convex polygon, the processor 1 applies the same process as the one performed by the first triangulate section 703 to generate several pieces of triangle data Dtri on the working area 3 (step S34). Thereafter, the processor 1 applies the same process as the one performed by the triangle rendering section 705 to generate image data Dimage on the working area 3 (step S35). Specifically, the image data Dimage is the one representing the polygon P which is color-filled in accordance with the color information, i.e., additional information. As such, in steps S34 and S35, if the polygon data Dpoly specifies the polygon P as being a convex polygon, the processor 1 applies the simpler first triangulate process thereto. Accordingly, the polygon rendering device Urend is not burdened that much to render the convex polygon P.

After step S35 is through, the processor 1 transfers the image data Dimage generated on the working area 3 to the display device Udisp (step S38). In accordance with the image data Dimage, the display device Udisp applies the display process so that the polygon P is displayed on its screen.

Figure 4:
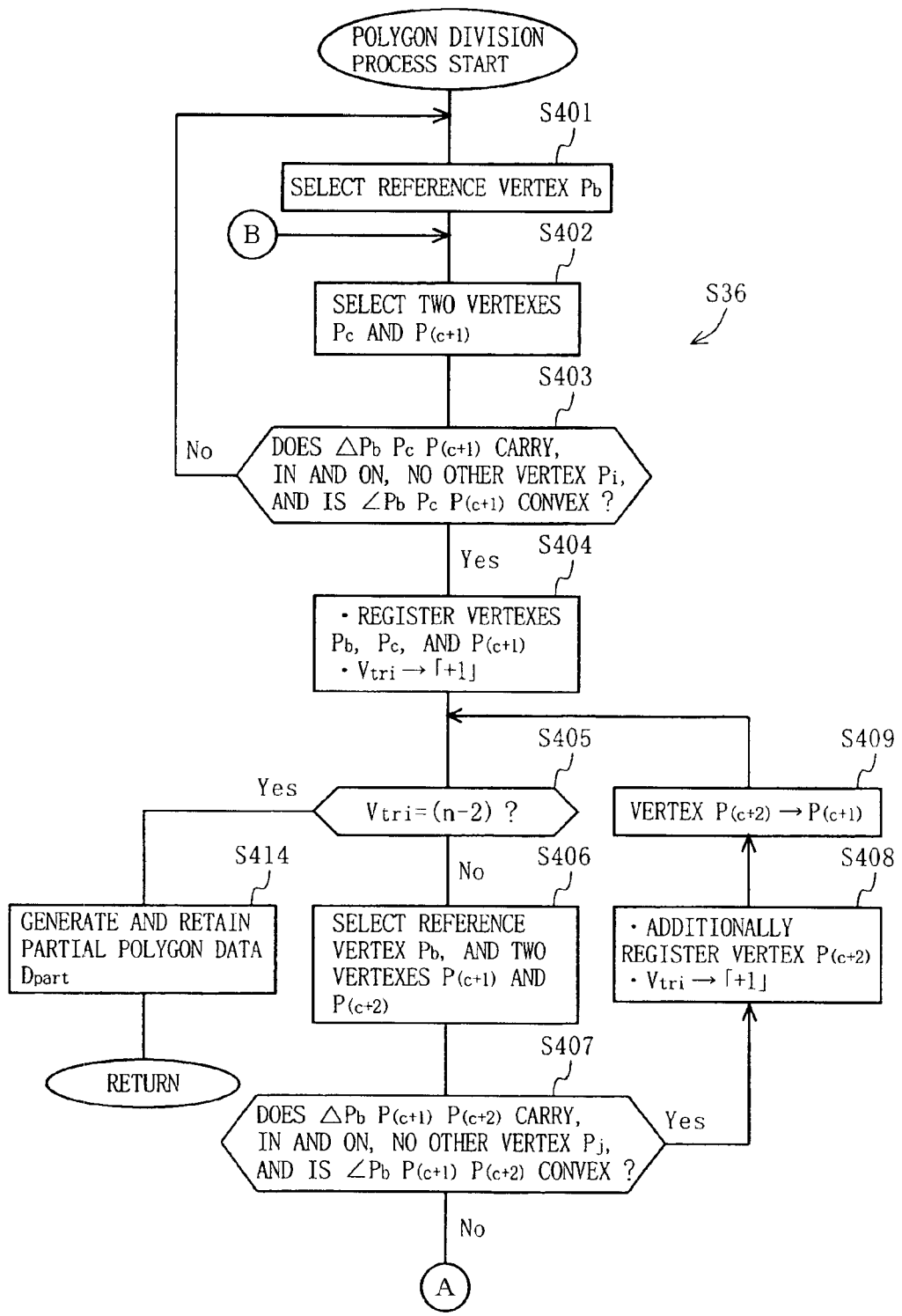
FIG. 4 is the first half of the flowchart showing the detailed procedure of step S36 of FIG. 3.
Figure 5:
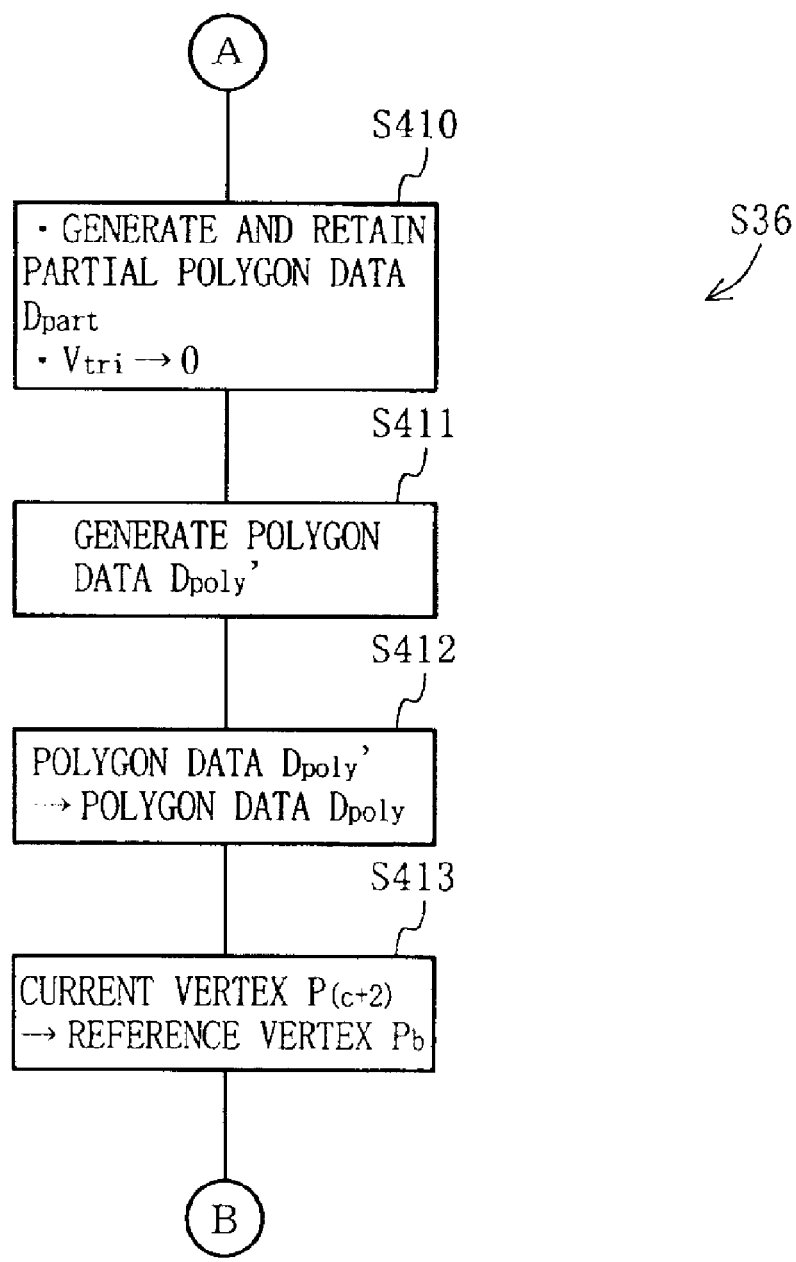
FIG. 5 is the second half of the flowchart showing the detailed procedure of step S36 of FIG. 3.

On the other hand, if the polygon data Dpoly specifies the polygon P as being a concave polygon in step S33, the processor 1 goes through a process to divide the polygon P into a plurality of partial polygons PP (step S36). Hereinafter, such a process is referred to as a polygon division process. Step S36 corresponds to a polygon division section. Here, FIG. 4 is a flowchart showing the first half of the detailed procedure of the polygon division process, and FIG. 5 is a flowchart showing the second half thereof. Referring to FIG. 4, first, the processor 1 selects a reference vertex Pb (where b is 1, 2, ..., n) from the vertexes P1 to Pn included in the polygon Dpoly on the working area 3 (step S401).

Also from the vertexes P1 to Pn on the working area 3, the processor 1 then selects vertexes Pc and P(c+1) (step S402). In step S402, according to the data structure of the polygon data Dpoly, the vertex Pc positions immediately after the reference vertex Pb, and the vertex P(c+1) to the vertex Pc. In such an order, the vertex Pc is to be connected next to the reference vertex Pb when connecting the vertexes in the polygon data Dpoly in the forward direction to derive the polygon P in one stroke. Similarly, the vertex P(c+1) is connected next to the Pc.

Note that the combination of these steps S401 and S402 correspond to a first selection step.

The processor 1 then determines whether or not the following first and second conditions are satisfied (step S403). The first condition is such a condition that ΔPb Pc P(c+1) formed by the reference vertex Pb and the vertexes Pc and P(c+1), which are currently at hand, does not have any other vertex Pi therein. In the first condition, "any other vertex Pi" means at least one of the vertexes P1 to Pn which is not yet selected in steps S401 and S402. That is, in step S403, i≠b, i≠c, 1≠c+1.

The second condition is such a condition that ∠ Pb Pc P(c+1) formed by the current reference vertex Pb and vertexes Pc and P(c+1) is smaller than 180 degrees, i.e., convex. In order to determine whether ∠Pb Pc P(c+l) is smaller than 180 degrees, the same process as the one performed by the concave polygon determination section 702 in the Background Art will do, and thus no further description is given here.

In the case where both of the first and second conditions are not satisfied, the processor 1 regards the current reference vertex Pb as not being appropriate for a partial polygon PP, which will be described in detail later, so that the procedure returns to step S401 to select another reference vertex Pb.

In step S403, if both of the first and second conditions are satisfied, the processor 1 registers, to the working area 3, the current reference vertex Pb, and vertexes Pc and P(c+1) as vertexes of the partial polygon PP. The processor 1 also increments by 1 a counter value Vtri (the counter is not shown) so that its initial value 0 is changed to 1 (step S404). Here, the value Vtri denotes how many triangles, i.e., ΔPb Pc P(c+1) or ΔPb P(c+1) P(c+2), the partial polygon PP currently includes.

The processor 1 then determines whether the current counter value Vtri is equal to (n−2) or not (step S405). As an example, when 3 vertexes P are selected from n vertexes P1 to Pn of the polygon P to form a triangle, resultantly (n−2) pieces of triangles will be formed. Therefore, when the counter value Vtri indicates (n−2), itmeans that anypossible combination of vertexes Pb, P (c+1), and P(c+2)as to the current polygon P has been completely selected in step S406. On the other hand, if the counter value Vtri does not indicate (n−2), it means that selection in step S406 is not yet completed.

As such, in the case of Vtri=(n−2), the processor 1 determines that the current polygon P is now completely divided into a plurality of partial polygons PP so that the procedure goes to step S414. Here, step S414 is left for later description for easy understanding.

In the case of Vtri≠(n−2), the processor 1 determines that the current polygon P is not yet completely divided so that the procedure goes to step S406. In step S406, the processor 1 selects the current reference vertex Pb, and vertexes P(c+1) and P(c+2) from the vertexes P1 to Pn on the working area 3. In the case that the vertex Pn has been selected as the vertex P(c+1), the vertex P(c+2) will be the vertex P1. Herein, this step S406 corresponds to a second selection step.

In the polygon Dpoly on the working area 3, the vertex P(c+1) positions immediately after the vertex Pc, and the vertex P(c+2) after the vertex P(c+1). In such an order, the vertex P(c+1) is to be connected next to the vertex Pc when connecting the vertexes in the polygon data Dpoly in the forward direction to derive the polygon P in one stroke. Similarly, the vertex P(c+2) is connected next to the P(c+1).

After step S406, the processor 1 determines whether the following third and fourth conditions are satisfied (step S407) The third condition is such a condition that ΔPb P(c+1) P(c+2) formed by the reference vertex Pb, and the vertexes P(c+1) and P(c+2), which are currently at hand, does not have any other vertex Pj therein. In the third condition, "any other vertex Pj" means at least one of the vertexes P1 to Pn which is not yet selected in step S406. That is, in step S407, j≠b, j≠b+1, 1≠c+2.

The fourth condition is such a condition that ∠ Pb P(c+1) P(c+2) formed by the current reference vertex Pb, and vertexes P(c+1) and P(c+2) is smaller than 180 degrees, i.e., convex. In order to determine whether ∠Pb P(c+1) P(c+2) is smaller than 180 degrees, the known technique as discussed above will do, and thus no further description is given here.

In step S407, if both of the third and fourth conditions are satisfied, the processor 1 additionally registers, to a predetermined region of the working area 3, the current reference vertex P(c+2) as a vertex of the partial polygon PP. The processor 1 also increments by 1 the counter value Vtri (the counter is not shown) (step S408). The case of not meeting both the third and fourth conditions is left for later description.

After step S408, the processor 1 sets the current vertex P(c+2) as a new vertex P(c+1) (step S409). This step S409 corresponds to a setting step. Then, the procedure returns to step S405, and the loop of steps S405 to S409 is repeated until the processor 1 determines as Vtri=(n−2) in step S405, or until the third and fourth conditions are determined as not being satisfied in step S407.

In step S405 as a part of the loop, when Vtri=(n−2) is satisfied, the processor 1 regards the current polygon P as being completely divided into a plurality of partial polygons PP so that the procedure goes to step S414. By the time when the polygon division process has come to step S414, the vertexes found in the working area 3 will be those forming the partial polygon PP which has been divided most recently. Specifically, the vertexes of the most-recently-divided partial polygon PP include the current vertexes Pb, Pc, and P(c+1) only, or together with the vertex P(c+2), at least one, if additionally registered in step S408. From those vertexes, the processor 1 generates partial polygon data Dpart (step S414), and this is the end of the polygon division process shown in FIGS. 4 and 5. That is, step S36 in FIG. 3 is now through, and the procedure goes to step S37.

The partial polygon data Dpart generated in step S414 specifies the partial polygon PP. Here, the partial polygon PP is a part of the polygon P. More specifically, the partial polygon PP is ΔPb Pc P(c+1) only, or together with at least one ΔPb P(c+1) P(c+2). Here, if the partial polygon PP is formed by several triangles, ΔPb Pc P(c+1) and ΔPb P(c+1) P(c+2) included in the partial polygon PP share at least one polygon edge with ΔPb P(c+1) P(c+2) and ΔPb Pc P(c+1).

In the case where both of the third and fourth conditions are not satisfied in step S407, the processor 1 regards the current vertex P(c+2) as not being appropriate for the current partial polygon PP, and also regards that one partial polygon PP is now divided from the polygon Pso that the procedure goes to step S410. Here, the reason why the current vertex P(c+2) is regarded as not appropriate for the partial polygon PP will be described later.

By the time when the polygon division process has come to step S410, the vertexes found in the working area 3 will be those forming one partial polygon PP. Specifically, the vertexes of the partial polygon PP include the current vertexes Pb, Pc, and P(c+1) registered in step S404 only, or together with the vertex P(c+2), at least one, if additionally registered in step S408. From those vertexes, the processor 1 generates partial polygon data Dpart, and retains it on the working area 3. Here, the partial polygon data Dpart generated in this step S410 specifies the same partial polygon PP specified by the partial polygon data Dpart generated in step S414. Here, by the time step S410 has been through, one partial polygon PP will be completely generated so that the counter value Vtri is reset to 0 as a preparation to calculate the number of triangles included in the next partial polygon PP (step S410).

From the polygon data Dpoly on the working area 3, the processor 1 then generates polygon data Dpoly' (step S411). More specifically, from the vertex coordinates P1 to Pn in the polygon data Dpoly, the processor 1 eliminates the vertexes Pc, P(c+1), and P(c+2) which have been selected in steps S402 and 406. It should be noted here that the vertex P(c+2) which is most recently selected, that is, the current vertex P(c+2), is not eliminated because it will be selected as the reference vertex Pb in the later step. The reference vertex Pb is not eliminated either because it is needed to structure the polygon data Dpoly'. In order to ease the later process, the processor 1 rearranges the order of the vertex coordinates P which have not been selected, and generates the polygon data Dpoly' carrying the vertex coordinates P(c+2) to Pn, and Pb in order therein. In other words, the polygon data Dpoly' is in such a data structure that a polygon to be formed by these current vertexes can be drawn in one stroke. Any additional information included in the polygon data Dpoly may passed to the polygon data Dpoly' as it is, or may be saved on a region of the working area 3.

The processor 1 then sets the polygon data Dpoly' as the new polygon data Dpoly (step S412), and also sets the current vertex P(c+2) as the new reference vertex Pb (step S413). Then, the procedure returns to step S402 in FIG. 4 to go through the sequence of processes.

Figure 6A:
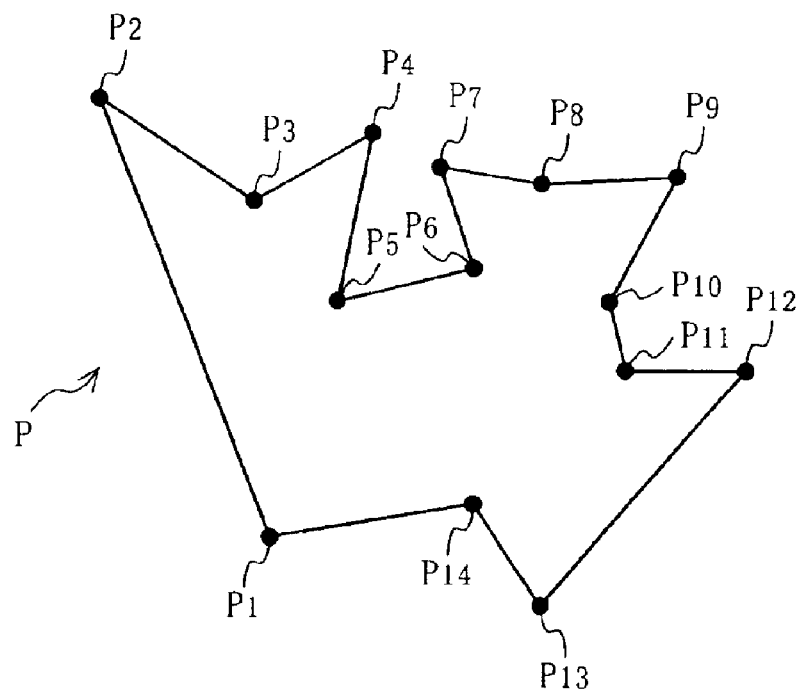
FIG. 6A is a diagram showing an exemplary polygon P to be rendered by the polygon rendering device Urend of FIG. 1.
Figure 6B:
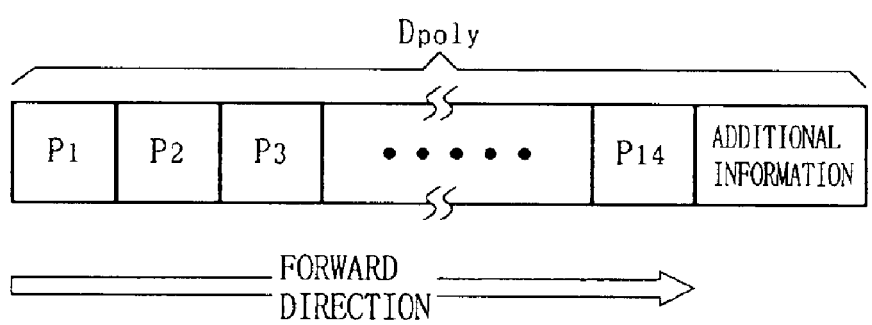
FIG. 6B is a diagram showing polygon data Dpoly needed for going through a rendering process to be applied to the polygon P of FIG. 6A.

As such, the polygon division process is described with reference to FIGS. 4 and 5. For better understanding, the polygon division process is described for a case where the polygon P specified by the polygon data Dpoly is a concave polygon as shown in FIG. 6A. Assuming here that the polygon data Dpoly specifying the concave polygon P of FIG. 6 includes vertex coordinates p1 to P14 in such an order as shown in FIG. 6B.

Figure 7A:
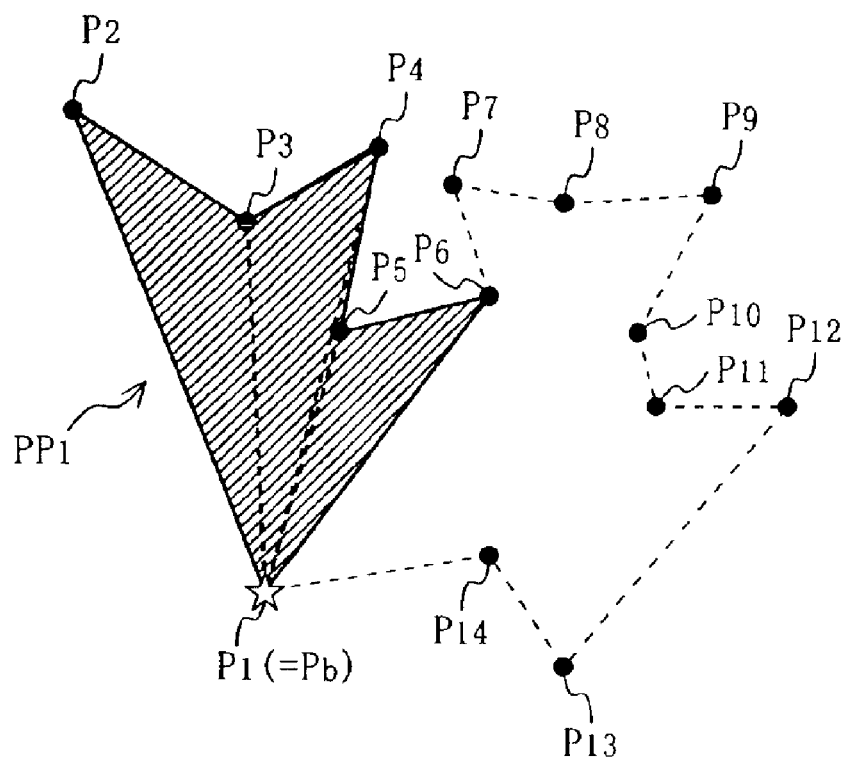
FIG. 7A is a diagram showing a partial polygon PP1 which is to be rendered first in the rendering process applied to render the polygon P of FIG. 6A.

In step S401, the vertex P1 is selected as the reference vertex Pb, which is indicated by a star mark in FIG. 7A. In the next step S402, the vertex P2 is selected as the vertex Pc, and the vertex P3 as the vertex P(c+1). Assuming in step S403 that ΔP1 P2 P3 satisfies the first condition and ∠P1 P2 P3 satisfies the second condition, in step S404, the vertexes P1 to P3 are registered as vertexes of the partial polygon PP, and the counter value Vtri is changed from its initial value 0 to 1.

Assuming that the vertexes P1 to P3 are the only vertexes so far registered for the partial polygon PP, the counter value Vtri is equal to 1. Since (n−2) is now 12, the counter value Vtri is not (n−2) in step S405. Thus, in step S406, the combination of vertexes P1, P3, and P4 will be selected as the combination of the reference vertex Pb, and the vertexes P(c+1) and P(c+2) Assuming in step S407 that ΔP1 P3 P4 satisfies the third condition and ∠P1 P3 P4 satisfies the fourth condition, the vertex P4 is additionally registered as a vertex of the partial polygon PP in step S408, and the counter value Vtri is changed from 1 to 2. In the next step S409, the vertex P4 which is the current vertex P(c+2) is set as the new vertex P(c+1).

If the counter value Vtri is determined as not yet indicating (n−2) in step S405, the procedure again goes to step S406. Since the current reference vertex Pb and the vertex P(c+1) are the vertexes P1 and P4, respectively, selected in step S406 as the vertex P(c+2) is the vertex P5. Assuming in step S407 that ΔP1 P4 P5 satisfies the third condition and ∠P1 P4 P5 satisfies the fourth condition, in step S408, the vertex P5 is additionally registered as a vertex of the partial polygon PP, and the counter value Vtri is changed from 2 to 3. In the next step S409, the vertex P5 which is the current vertex P(c+2) is set as the new vertex P(c+1).

If the counter value Vtri is determined as not yet indicating (n−2) in step S405, selected in step S406 as the vertex P(c+2) is the vertex P6. Assuming in step S407 that ΔP1 P5 P6 satisfies the third condition and ∠P1 P5 P6 satisfies the fourth condition, in step S408, the vertex P6 is additionally registered as a vertex of the partial polygon PP, and the counter value Vtri is changed to 4. In the next step S409, the vertex P6 is set as the new vertex P(c+1).

If the counter value Vtri is determined as not yet indicating (n−2) in step S405, selected in step S406 as the vertex P(c+2) is the vertex P7. Here, if ∠P1 P6 P7 is exceeding 180 degrees, i.e., concave, the fourth condition is not satisfied. Therefore, the processor 1 regards the current vertex P(c+2), i.e., the vertex P7, is not appropriate as the vertex of the partial polygon PP. The reason why the vertex P7 is considered not appropriate is, if ∠P1 P6 P7 as ∠Pb P(c+1) P(c+2) is concave, the line segment from the vertex P6 to P7 goes backward with respect to the line segment from the vertex P5 to P6 so that the partial polygon PP cannot be correctly rendered in the later step S37. For the same reason, when the third condition is not satisfied, the vertex P(c+2) is determined as not being appropriate as the vertex of the partial polygon PP.

As such, when both of the third and fourth conditions are determined as not being met, the processor 1 determines that one partial polygon PP is now divided from the polygon P so that the procedure goes to step S410. In step S410 in this example, the polygon data Dpart including the vertex coordinates P1 to P6 is generated and retained. Further, in step S410, the counter value Vtri which is indicating 4 is reset to 0. Here, for convenience, the partial polygon data Dpart which is currently generated is referred to as partial polygon data Dpart1. The partial polygon data Dpart1 specifiesa partial polygon PP1 (shown with hatched lines descending toward left in FIG. 7A) formed by the vertexes P1 to P6.

Here, the partial polygon PP1 is structured by ΔP1 P2 P3, ΔP1 P3 P4, ΔP1 P4 P5, and ΔP1 P5 P6, all of which share the same reference vertex Pb(=P1). Moreover, ΔP1 P2 P3 share a polygon edge P1 P3 with ΔP1 P3 P4. Other than those, ΔP1 P3 P4, ΔP1 P4 P5, and ΔP1 P5 P6 are also included in the partial polygon PP1, and share at least one polygon edge with at least one other triangle.

Figure 7B:
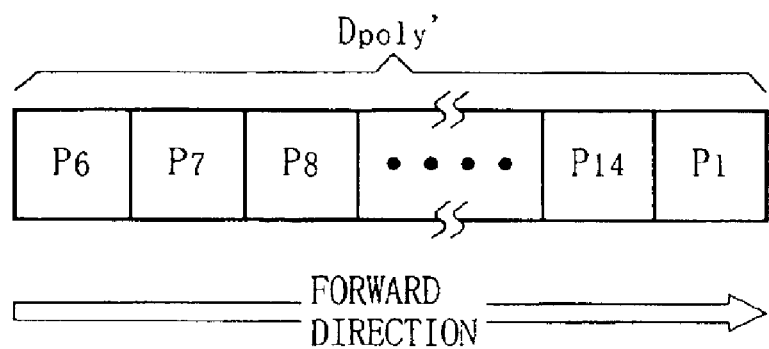
FIG. 7B is a diagram showing the data structure of polygon data Dpoly' to be generated first in step S411 of FIG. 5.

In step S411, as already described, except for the vertexes Pc and P(c+1), and the current vertex P(c+2), any other vertex(es) P(c+2) are eliminated from the vertex coordinates P1 to Pn. Accordingly, after the vertex coordinates P2 to P5 are eliminated from the polygon data Dpoly on the working area 3, the vertex coordinates P are rearranged in order so that the polygon data Dpoly' carrying 10 vertex coordinates P6 to P14 in order is generated as shown in FIG. 7B. Then in step S412, the polygon data Dpoly' is set as the new polygon data Dpoly. Then in step S413, the vertex P6 is set as the reference vertex Pb.

Figure 8A:
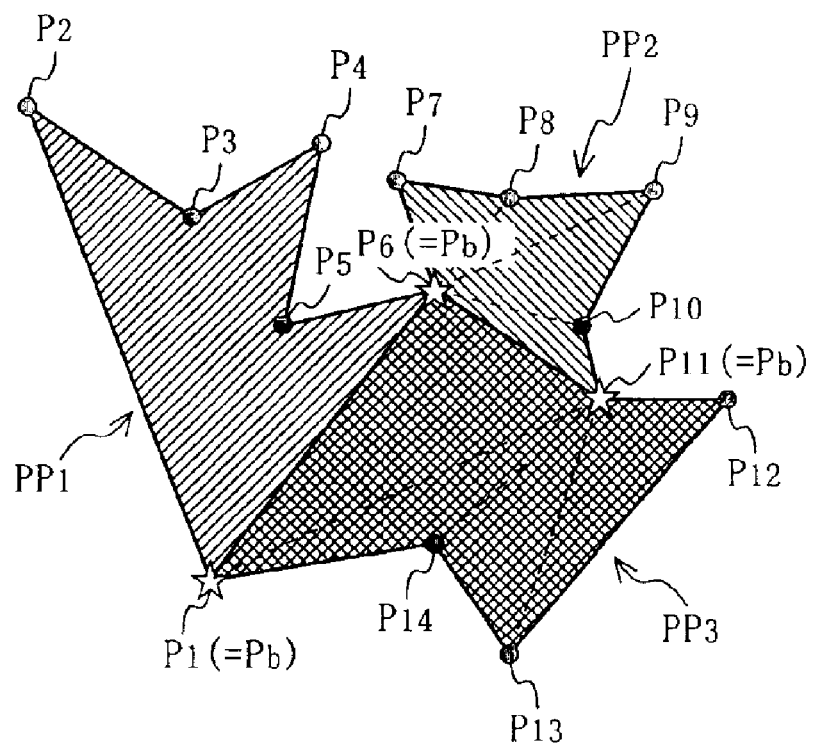
FIG. 8A is a diagram showing partial polygons PP1 to PP3 to be rendered in the rendering process applied to render the polygon P of FIG. 6A.
Figure 8B:
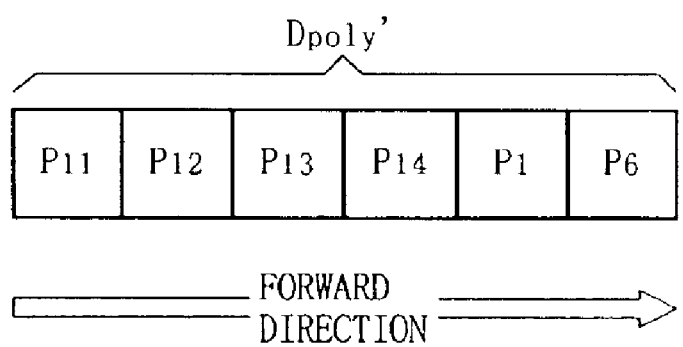
FIG. 8B is a diagram showing the data structure of polygon data Dpoly' to be generated last in step S411 of FIG. 5.

In the case where the vertex P6 is the reference vertex Pb, the third and fourth conditions remain satisfied until the vertex P11 becomes the vertex P(c+1) and the vertex P12 the vertex P(c+2) (step S407). Accordingly, generated and retained in step S410 is partial polygon data Dpart2 by which such a partial polygon PP2 (shown with hatched lines descending toward right) as shown in FIG. 8A is specified. In step S411, aftere liminating the vertex coordinates P7 to P10 from the polygon data Dpoly on the working area 3, the vertex coordinates P are rearranged in order. As a result, generated is the polygon data Dpoly' carrying, as shown in FIG. 8B, 6 sets of vertex coordinates P11 to P14, P1, and P6 in order therein. This polygon data Dpoly' is then set as the new polygon data Dpoly in step S412.

Referring to FIG. 8A, in step S413, after the vertex P11 is set as the reference vertex Pb, the procedure of the polygon division process returns to step S402. In step S402, the vertex S12 is selected as the vertex Pc, and the vertex P13 as the vertex P(c+1). Here, assuming in step S403 that ΔP11 P12 P13 satisfies the first condition and ΔP11 P12 P13 satisfies the second condition, in step S404, the vertexes P11 to P13 are registered, and the counter value Vtri is updated to 1.

Assuming that the vertexes P11 to P13 are the only vertexes so far registered for the partial polygon PP, the counter value Vtri is equal to 1. Since (n−2) is now 4, the counter value Vtri is not (n−2) in step S405. Thus, in step S406, the combination of vertexes P11, P13, and P14 will be selected as the combination of the reference vertex Pb, and the vertexes P(c+1) and P(c+2). Assuming in step S407 that ΔP11 P13 P14 satisfies the third condition and ∠P11 P13 P14 satisfies the fourth condition, the vertex P14 is additionally registered as a vertex of the partial polygon PP in step S408, and the counter value Vtri is changed to 2. In the next step S409, the vertex P14 which is the current vertex P(c+2) is set as the new vertex P(c+1).

If the counter value Vtri is determined as not yet indicating (n−2) in step S405, the procedure again goes to step S406. Since the current reference vertex Pb and the vertex P(c+1) are the vertexes P11 and P14, respectively, and since the vertex P1 follows immediately after the vertex P14 in the current polygon data Dpoly, selected in step S406 as the vertex P(c+2) is the vertex P1. Assuming in step S407 that ΔP11 P14 P1 satisfies the third condition and ∠P11 P14 P1 satisfies the fourth condition, in step S408, the vertex P1 is additionally registered, and the counter value Vtri is updated to 3. In the next step S409, the vertex P1 which is the current vertex P(c+2) is set as the new vertex P(c+1).

If the counter value Vtri is determined as not yet indicating (n−2) in step S405, selected in step S406 as the vertex P(c+2) is the vertex P6, which follows immediately after the vertex P1. Assuming in step S407 that ΔP11 P1 P6 satisfies the third condition and ∠P11 P1 P6 satisfies the fourth condition, in step S408, the vertex P6 is additionally registered, and the counter value Vtri is updated to 4. In the next step S409, the vertex P6 is set as the new vertex P(c+1).

Then, when the counter value Vtri is determined as being (n−2) in step S405, the processor 1 regards the partial polygon PP as being perfectly divided from the polygon P. The procedure then goes to step S414. In step S414, generated and retained is partial polygon data Dpart including the vertex coordinates P11 to P14, P1, and P6 which are found in the working area 3. For convenience, the resultant partial polygon data Dpart is referred to as partial polygon data Dpart3. The partial polygon data Dpart3 specifies a partial polygon PP3 which is indicated by the double-hatched area in FIG. 8B.

Described above is the specific example of the polygon division process by referring to FIGS. 6 to 8. In the example, generated on the working area 3 are three pieces of partial polygon data Dpart 1 to Dpart 3. After generating such partial polygon data, the procedure goes to step S37 of FIG. 3.

In step S37, the processor 1 selects one partial polygon data Dpart generated in step S36, and then generates partial image data which represents the partial polygon PP on the working area 3 in accordance with color information, i.e., additional information of the polygon data Dpoly. To be more specific, the partial image data is the one defining the partial polygon PP by shape, and representing the partial polygon PP which is filled by the color specified by the color information. The processor 1 applies the process as described above to any other partial polygon data Dpart so that the image data Dimage is generated on the working area 3 which defines the polygon P by shape, and represents the polygon P color-filled in accordance with the color information (step S37). Here, this step S37 corresponds to a partial polygon rendering section.

Figure 9:
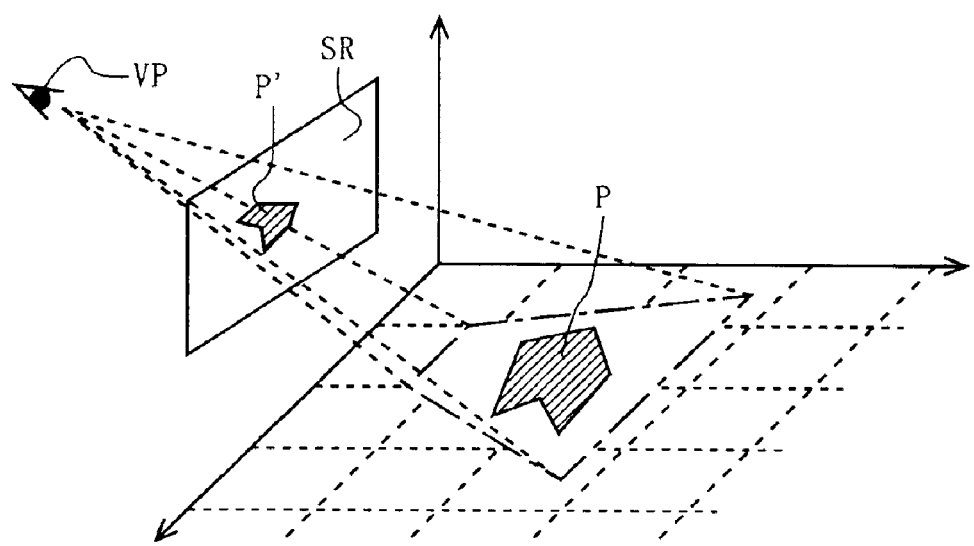
FIG. 9 is a diagram showing the concept of perceptive projection transformation carried out in step S37 of FIG. 3.

Here, as shown in FIG. 9, in step S37, the processor 1 may apply a perspective projection transformation process with respect to the partial polygon data Dpart generated in step S36. Specifically, in the perspective projection transformation process, the partial polygon data Dpart is subjected to coordinate transformation so that the partial polygons PP are projected onto a screen SR perpendicular to the vector representing the line of sight including a predetermined viewpoint on the 3D space. As a result, displayed on the screen SR is a polygon P'.

After step S37 is through, the processor 1 transfers the image data Dimage generated on the working area 3 to the display device Udisp (step S38). In accordance with the image data Dimage, the display device Udisp performs the display process so that the polygon P is displayed on its screen.

As described above, according to the polygon rendering device Urend of the present embodiment, the polygon division process (step S36) divides the concave polygon P into the partial polygons PP. Accordingly, in step S37, the process of rendering partial polygons is carried out on the partial polygon PP basis, and resultantly generated is the image data Dimage representing the concave polygon P. Therefore, compared with the conventional rendering process applied to the concave polygon P, the amount of data, especially the number of vertex coordinates P can be reduced to a greater degree in the process of rendering partial polygons. Accordingly, the concave polygon Pcanbe rendered at higher speeds.

Here, in the above, steps S36 and S37 are carried out with respect to the polygon data Dpoly specifying the polygon P as being a concave polygon. This is not restrictive, and those steps may be applied to the polygon data Dpoly specifying the polygon P as being a convex polygon.

Also in the above discussion, the processor 1 reads out the polygon data Dpoly in step S31 from the storage device Ustor which is internally provided in the terminal device Dterm to the working area for the later processes. Alternatively, the processor 1 may transfer the polygon data Dpoly coming over communications paths typified by networks and buses to the working area 3, and carry out steps S32 to S38 with respect to the polygon data Dpoly. That is, the polygon rendering device Urend does not necessarily require the storage device Ustor.

Further, in the above, the processor 1 transfers the image data Dimage in step S38 from the working area 3 to the display device Udisp which is internally provided in the terminal device Dterm. This is not restrictive, and the processor 1 may transfer the image data Dimage to the display device which is externally provided to the terminal device Dterm over the communications paths. That is, the polygon rendering device Urend does not necessarily require the storage device Ustor.

Also in the above discussion, the polygon data Dpoly presumably includes the vertex coordinates P1 to Pn in such an order that the polygon P can be rendered in one stroke. Here, if the polygon data Dpoly does not carry the vertex coordinates P in such an order, the processor 1 may rearrange the vertex coordinates P1 to Pn in such an order in accordance with the connection information, i.e., additional information, before going to step S36.

Figure 10A:
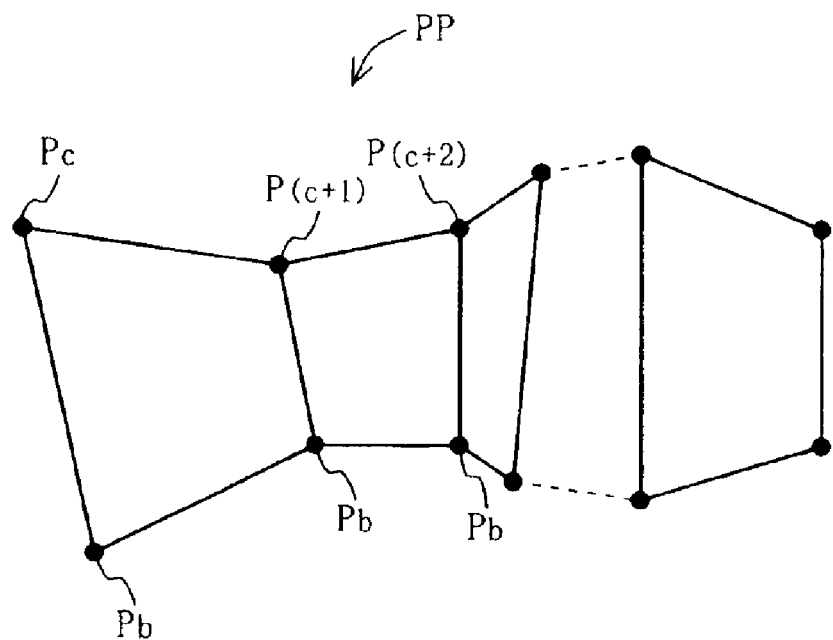
FIG. 10A is a diagram showing the concept of step S37 of FIG. 3 for a case where the process 1 is capable of rendering only simple rectangles.
Figure 10B:
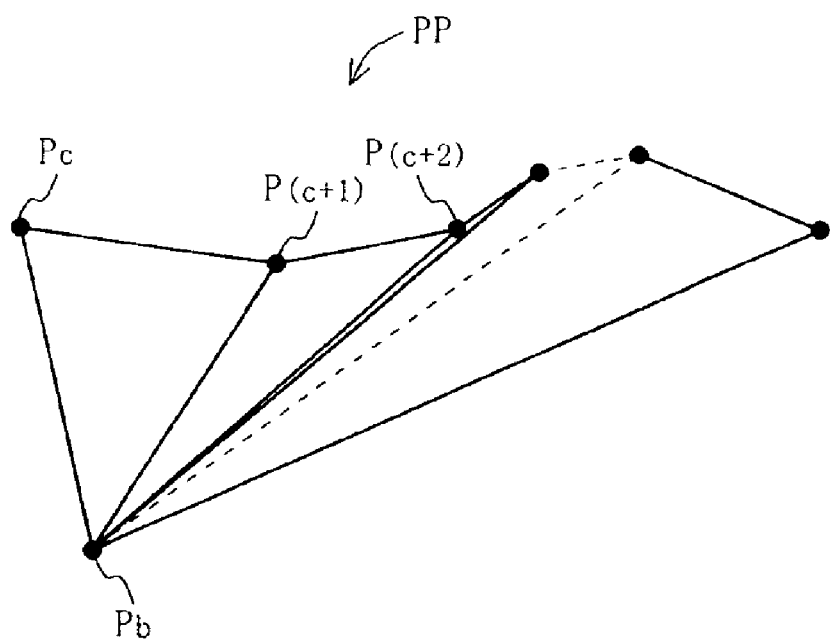
FIG. 10B is a diagram showing a partial polygon PP to be rendered as a result of the process shown in FIG. 10A.
Figure 14:
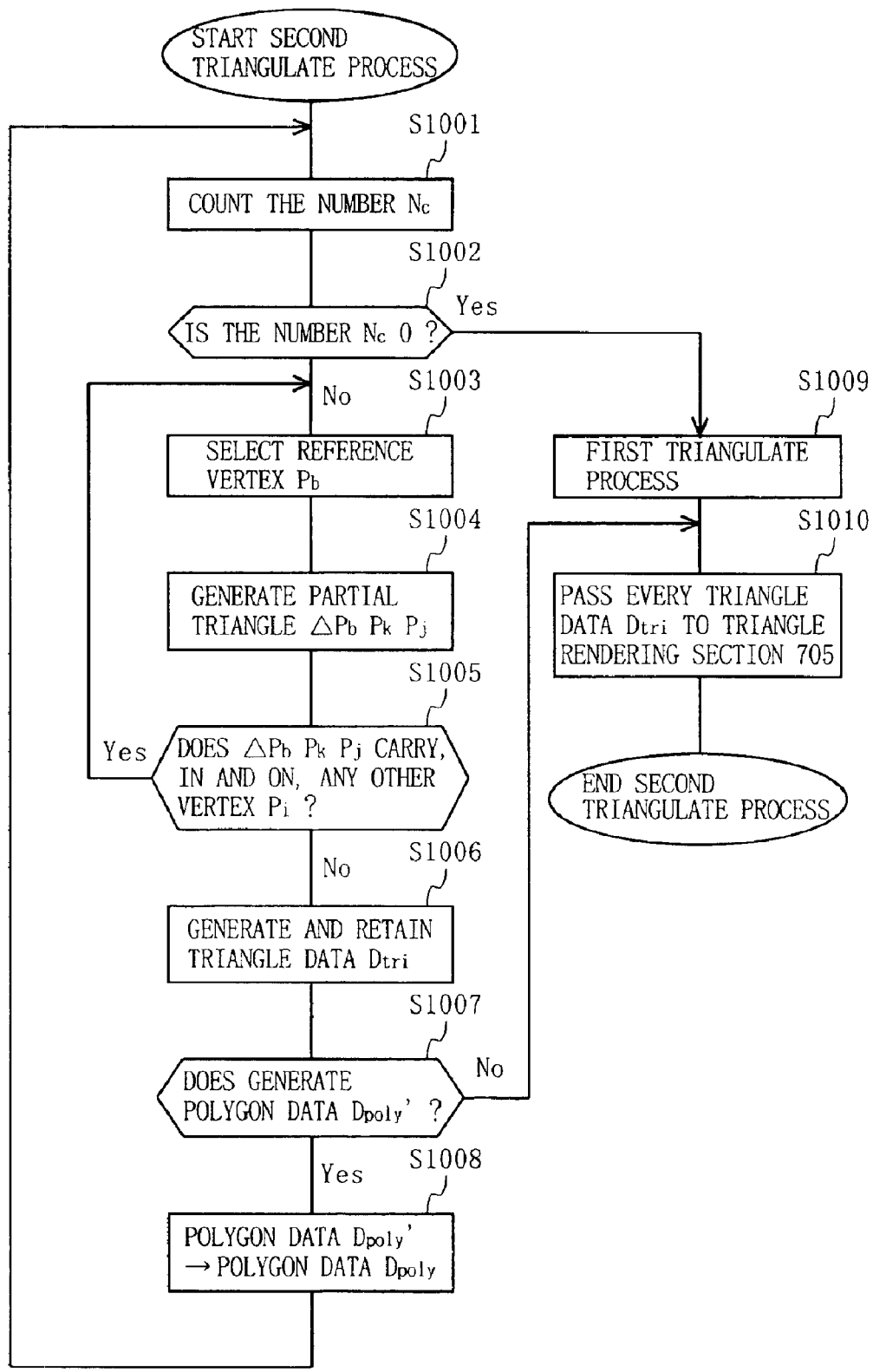
FIG. 14 is a flowchart showing the procedure of a second triangulate process in the rendering device CUrend of FIG. 11.

Also in the above discussion, if the partial polygon PP is structured by a plurality of triangles, the partial polygon data Dpart in the storage device Ustor includes, together with the reference vertex Pb, vertex coordinates P which specify a partial polygon PP structured by a triangle ΔPb Pc P(c+1), and at least one triangle ΔPb P(c+1) P(c+2). In some cases, however, the processor 1 may be capable of rendering only simple rectangles due to its computing power. If so, as the partial polygon data Dpart, the processor 1 may generate data including, together with the reference vertex Pb, vertex coordinates P which specify a partial polygon PP structured by a rectangle □Pb Pc P(c+1) Pb, and at least one rectangle □Pb P(c+1) P(c+2) Pb. If the processor 1 carries out the process of rendering partial polygons (step S37) in accordance such partial polygon data Dpart, formally, resultantly rendered will be the rectangles □Pb Pc P(c+1) Pb, and □Pb P(c+1) P(c+2) Pb as shown in FIG. 10A. Since these rectangles share the same reference vertex Pb, such a partial polygon PP as shown in FIG. 10B can be resultantly rendered.

While the invention has been described in detail, the foregoing description is in all aspects illustrative and not restrictive. It is understood that numerous other modifications and variations can be devised without departing from the scope of the invention.

What is claimed is:

1. A polygon rendering device comprising:
   a polygon division section for dividing, based on polygon data which specifies a polygon to be rendered, the polygon into a plurality of partial polygons such that at least one of the plurality of partial polygons has formed therein, from vertices thereof, a plurality of triangles which respectively share a vertex of the polygon; and
   a partial polygon rendering section for performing a rendering process and, without requiring, further division of any of the plurality of partial polygons, generating partial image data which represents an image of the at least one partial polygon from partial polygon data, wherein
   a plurality of partial image data represents an image of the polygon when combined,
   the polygon data includes n sets of vertex coordinates P1 to Pn of the polygon in such an order that the polygon can be rendered in one stroke in a forward direction, and
   said polygon division section
      selects one of the vertex coordinates P1 to Pn of the polygon data as a reference vertex Pb (b=1, 2, . . . , n), and in the forward direction, selects a vertex Pc positioned adjacent to the reference vertex Pb and a vertex P(c+1) positioned adjacent to the vertex Pc, and a triangle ΔPb Pc P(c+1) formed by the reference vertex Pb, and the vertexes Pc and P(c+1) carries, in and on, no other vertex Pi (i=1, 2, . . . , n, and i≠b, i≠c, i≠c+1) belonging to the polygon and not yet selected, and an angle ∠Pb Pc P(c+1) formed by the reference vertex Pb, and the vertexes Pc and P(c+1) is smaller than 180 degrees,
      selects, in addition to the reference vertex Pb and the vertex P(c+1), a vertex P(c+2) which is positioned adjacent to the vertex P(c+1) in the forward direction, and a triangle ΔPb P(c+1) P(c+2) formed by the reference vertex Pb, and the vertexes P(c+1) and P(c+2) carries no other vertex Pj (j=1, 2, . . . , n, and j≠b, j≠c, j≠c+1, j≠c+2) which belongs to the polygon and not yet selected, and an angle ΔPb P(c+1) P(c+2) formed by the reference vertex Pb, and the vertexes P(c+1) and P(c+2) is smaller than 180 degrees, and
   generates the partial polygon data specifying at least the partial polygon formed by the reference vertex Pb, and the vertexes Pc, P(c+1), and P(c+2).

2. The polygon rendering device according to claim 1, wherein said polygon division section
   sets, when the vertex P(c+2) selected thereby satisfies a condition that the triangle ΔPb P(c+1) P(c+2) carries, in and on, no other vertex Pj, and the angle ∠Pb P(c+1) P(c+2) is smaller than 180 degrees, the vertex P(c+2) as the vertex P(c+1),
   keeps selecting, until the condition is no longer satisfied, together with the reference vertex Pb and the newly-set vertex P(c+1), a new vertex P(c+2) which is positioned adjacent to the newly set vertex P(c+1), and
   generates the partial polygon data which specifies the partial polygon formed by the reference vertex Pb, the vertexes Pc and P(C+1), and at least one of the vertexes P(c+2).

3. A polygon rendering method comprising;
   a polygon division operation of dividing, based on polygon data which specifies a polygon to be rendered, the polygon into a plurality of partial polygons such that at least one of the plurality of partial polyvons has formed therein, from vertices thereof, a plurality of triangles which respectively share a vertex of the polygon; and
   a partial polygon rendering operation of performing a rendering process and, without requiring further division of any of the plurality of partial polygons, generating partial image data which represents an image of the at least one partial polygon from partial polygon data, wherein
   a plurality of partial image data represents an image of the polygon when combined,
   the polygon data includes n sets of vertex coordinates P1 to Pn of the polygon in such an order that the polygon can be rendered in one stroke in a forward direction,
   said polygon division operation includes
      a first selection operation of selecting one of the vertex coordinates P1 to Pn of the polygon data as a reference vertex Pb (b=1, 2, . . . , n), and in the forward direction, selecting a vertex Pc positioned adjacent to the reference vertex Pb and a vertex P(c+1) positioned adjacent to the vertex Pc, and a triangle ΔPb Pc P(c+1) formed by the reference vertex Pb, and the vertexes Pc and P(c+1) carries, in and on, no other vertex Pi (i=1, 2, . . . , n, and i≠b, i≠c, i≠c+1) belonging to the polygon and not yet selected, and an angle ∠Pb Pc P(c+1) formed by the reference vertex Pb, and the vertexes Pc and P(c+1) is smaller than 180 degrees, and a second selection operation of selecting, in addition to the reference vertex Pb and the vertex P(c+1), a vertex P(c+2) which is positioned adjacent to the vertex P(c+1) in the forward direction, and a triangle ΔPb P(c+1) P(c+2) formed by the reference vertex Pb, and the vertexes P(c+1) and P(c+2) carries no other vertex Pj (j=1, 2, . . . , n, and j≠b, j . c, j≠c+1, j≠c+2) which belongs to the polygon and not yet selected, and an angle ∠Pb P(c+1) P(c+2) formed by the reference vertex Pb, and the vertexes P(c+1) and P(c+2) is smaller than 180 degrees, and said polygon division operation generates the partial polygon data specifying at least the partial polygon formed by the reference vertex Pb, and the vertexes Pc, and P(c+1) selected in said first selection operation, and the vertex P(c+2) selected in said second selection operation.

4. The polygon rendering method according to claim 3, wherein said polygon division operation further includes a setting operation of setting the vertex P(c+2) to the vertex P(c+1) when the vertex P(c+2) selected in said second selection operation satisfies a condition that the triangle ΔPb P(c+1) P(c+2) carries, in and on, no other vertex Pj, and the angle ∠Pb P(c+1) P(c+2) is smaller than 180 degrees, said second selection operation keeps selecting, until the condition is no longer satisfied, together with the reference vertex Pb selected in said first selection operation, and the vertex P(c+1) newly set in said setting operation, a new vertex P(c+2) which is positioned adjacent to the newly-set vertex P(c+1), and said polygon division operation generates the partial polygon data which specifies the partial polygon formed by the reference vertex Pb, and the vertexes Pc and P(C+1) selected in said first selection operation, and the vertex P(c+2) selected in said second selection operation.

5. A polygon rendering program operable to instruct a processor to render a polygon, the polygon rendering program comprising:

a polygon division operation of dividing, based on polygon data which specifies a polygon to be rendered, the polygon into a plurality of partial polygons such that at least one of the plurality of partial polygons has formed therein, from vertices thereof, a plurality of triangles which respectively share a vertex of the polygons; and a partial polygon rendering operation of performing a rendering process and, without requiring further division of any of the plurality of partial polygons, generating partial image data which represents an image of the at least one partial polygon from partial polygon data, wherein a plurality of partial image data represents an image of the polygon when combined, the polygon data includes n sets of vertex coordinates P1 to Pn of the polygon in such an order that the polygon can be rendered in one stroke in a forward direction, said polygon division operation includes a first selection operation of selecting one of the vertex coordinates P1 to Pn of the polygon data as a reference vertex Pb (b=1, 2, . . . , n), and in the forward direction, selecting a vertex Pc positioned adjacent to the reference vertex Pb and a vertex P(c+1) positioned adjacent to the vertex Pc, and a triangle ΔPb Pc P(c+1) formed by the reference vertex Pb, and the vertexes Pc and P(c+1) carries, in and on, no other vertex Pi (i=1, 2, . . . , n, and i≠b, i≠c, i≠+1) belonging to the polygon and not yet selected, and an angle ∠Pb Pc P(c+1) formed by the reference vertex Pb, and the vertexes Pc and P(c+1) is smaller than 180 degrees, and a second selection operation of selecting, in addition to the reference vertex Pb and the vertex P(c+1), a vertex P(c+2) which is positioned adjacent to the vertex P(c+1) in the forward direction, and a triangle ΔPb P(c+1) P(c+2) formed by the reference vertex Pb, and the vertexes P(c+1) and P(c+2) carries no other vertex Pj (j=1, 2, . . . , n, and j≠b, j≠c, j≠c+1, j≠c+2) which belongs to the polygon and not yet selected, and an angle ∠Pb P(c+1) P(c+2) formed by the reference vertex Pb, and the vertexes P(c+1) and P(c+2) is smaller than 180 degrees, and said polygon division operation generates the partial polygon data specifying at least the partial polygon formed by the reference vertex Pb, and the vertexes Pc, and P(c+1) selected in said first selection operation, and the vertex P(c+2) selected in said second selection operation.

6. The polygon rendering program according to claim 5, wherein said polygon division operation further includes a setting operation of setting the vertex P(c+2) to the vertex P(c+1) when the vertex P(c+2) selected in said second selection operation satisfies a condition that the triangle ΔPb P(c+1) P(c+2) carries, in and on, no other vertex Pj, and the angle ∠Pb P(c+1) P(c+2) is smaller than 180 degrees, said second selection operation keeps selecting, until the condition is no longer satisfied, together with the reference vertex Pb selected in said first selection operation, and the vertex P(c+1) newly set in said second selection operation, a new vertex P(c+2) which is positioned adjacent to the newly set vertex P(c+1), and said polygon division operation generates the partial polygon data which specifies the partial polygon formed by the reference vertex Pb, and the vertexes Pc and P(C+1) selected in said first selection operation, and the vertex P(c+2) selected in said second selection operation.

7. The polygon rendering program according to claim 5, wherein the polygon rendering program is recorded on a recording medium.

* * * * *

UNITED STATES PATENT AND TRADEMARK OFFICE
CERTIFICATE OF CORRECTION

PATENT NO. : 6,977,652 B2
DATED : December 20, 2005
INVENTOR(S) : Keiichi Senda et al.

It is certified that error appears in the above-identified patent and that said Letters Patent is hereby corrected as shown below:

Column 16,
Line 15, replace "Δpb" with -- ∠Pb --.
Line 41, replace "polyvons" with -- polygons --.

Column 17,
Line 9, replace "j . c," with -- j≠c, --.

Signed and Sealed this

Thirtieth Day of May, 2006

JON W. DUDAS
*Director of the United States Patent and Trademark Office*